Jan. 2, 1951  H. A. JONES  2,536,290
TAXI DISPATCH BOARD
Filed Aug. 23, 1948  3 Sheets-Sheet 1

Hilbert A. Jones
INVENTOR.

BY Clarence A. O'Brien
and Harvey B. Jacobson
Attorneys

Jan. 2, 1951          H. A. JONES          2,536,290
TAXI DISPATCH BOARD
Filed Aug. 23, 1948          3 Sheets-Sheet 2
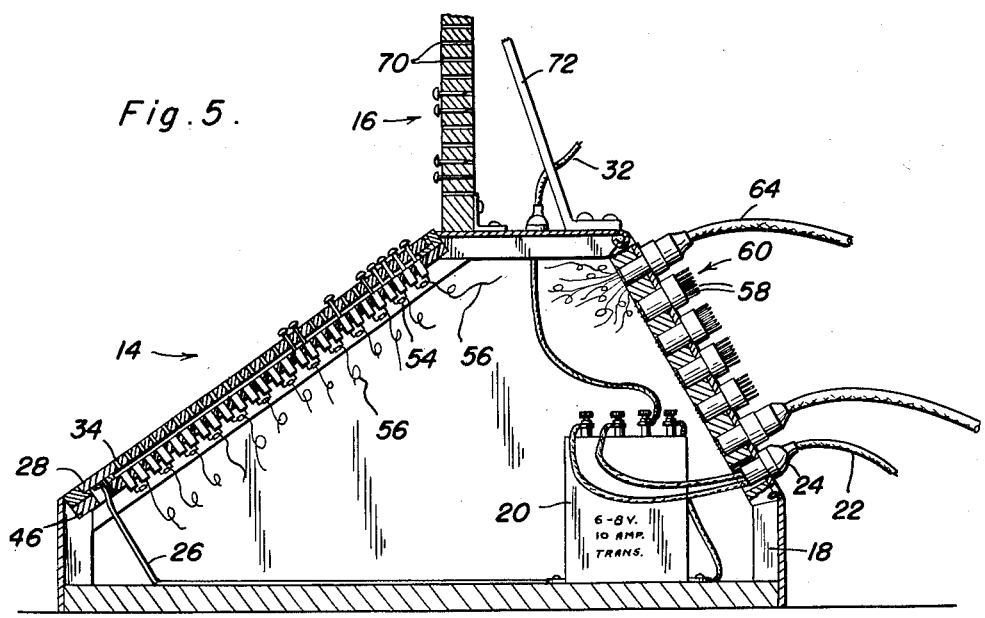
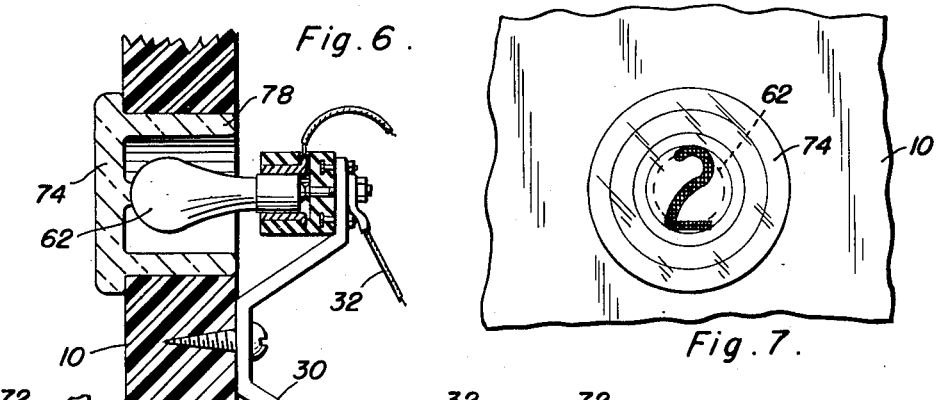
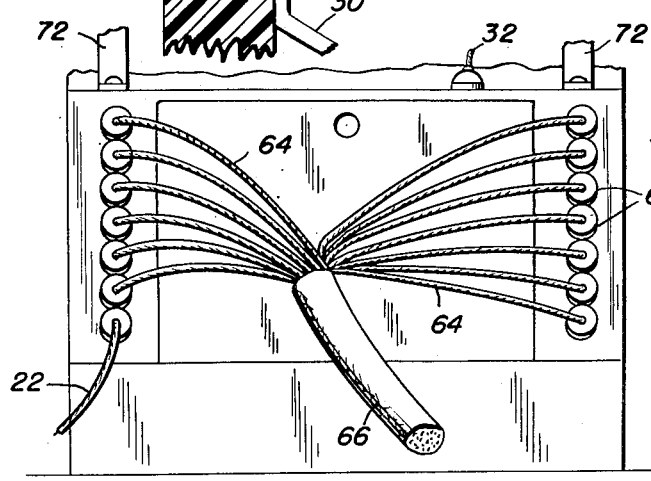
Hilbert A. Jones
INVENTOR.

Jan. 2, 1951 H. A. JONES 2,536,290
TAXI DISPATCH BOARD
Filed Aug. 23, 1948 3 Sheets-Sheet 3
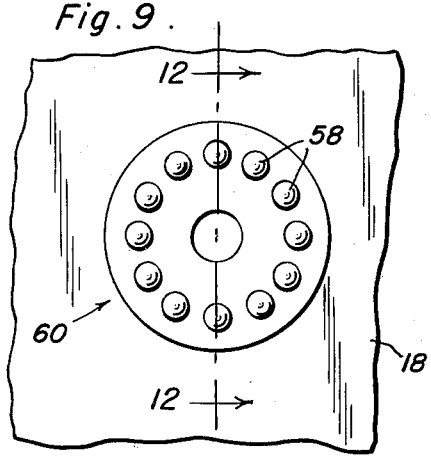
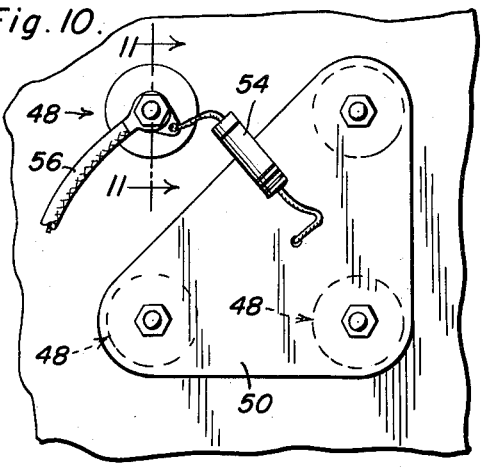
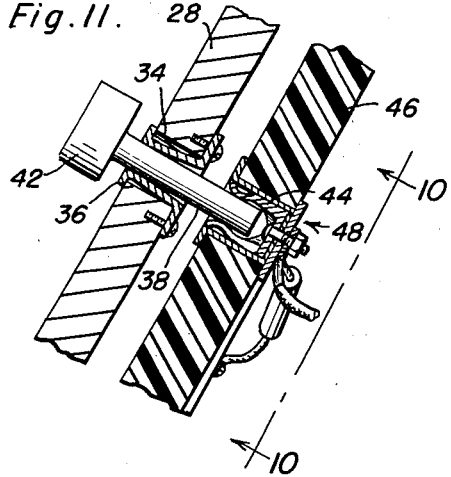
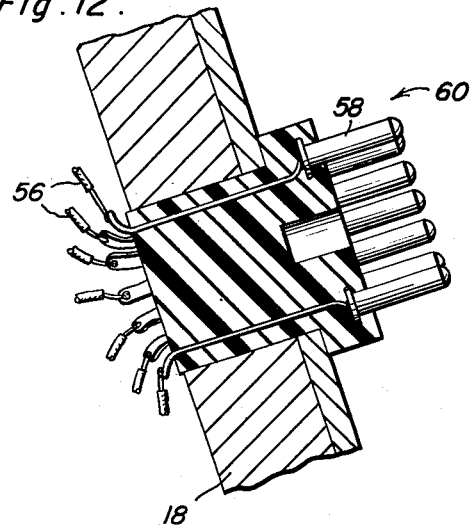
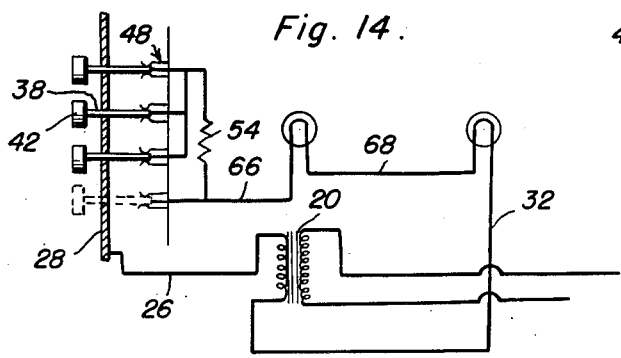
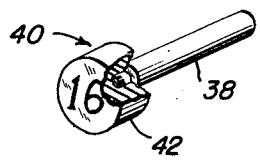
Hilbert A. Jones
INVENTOR.

Patented Jan. 2, 1951

2,536,290

UNITED STATES PATENT OFFICE 2,536,290

TAXI DISPATCH BOARD

Hilbert A. Jones, San Diego, Calif.

Application August 23, 1948, Serial No. 45,762

2 Claims. (Cl. 177—311)

This invention relates generally to manually controlled electrical sign boards and more particularly to a taxi dispatch board system, whereby a dispatcher is enabled to keep a current record of the geographical disposition of the taxi cabs and the number or name of the cab and/or driver who first arrives at each stand.

In brief, the invention includes a map of the territory concerned and provided with a plurality of lamps situated to correspond with the geographical disposition of the stands in the territory. These lamps are connected in series with another set of lamps arranged numerically on a taxi stand directory. A control board has individual jacks with numbered plugs corresponding to the number of cabs or drivers, the control board being numbered in accordance with the map and directory and a small number of jacks being associated with each numbered location on the control board. One of the jacks at each numbered location on the control board is connected with less resistance in its circuit leading to the lamps on the map and on the directory, so that a plug placed in this particular jack will cause the said lamps to glow more brightly, whereby the dispatcher may record the fact that a cab is actually at that particular stand and is the first to have arrived there, as well as the fact that one or more other cabs are either at that stand or have been directed to report in from that stand on arrival.

A primary object of this invention is, therefore, to allow a dispatcher to have an accurate, easily interpreted running record of the disposition of the cabs under his control.

Another object of this invention is to provide both an illuminated map and an illuminated directory, in conjunction with a control board whereon the numbers of the drivers or cabs at or approaching the different stands coact to provide very easily interpreted signals whereby undue concentration of cabs at any one stand will be prevented.

Still another object of this invention is to provide a dispatch board system which will indicate at a glance which drivers or cabs are inactive or off duty.

Still another object of this invention is to provide a dispatch board system which is ideally designed for use with telephone or radio communication linking the different stands with the dispatcher, complete information as to the disposition of the cabs being attained by manipulation of simple plugs in a control board and in a dead panel disposed adjacent thereto.

And a last object to be mentioned specifically is to provide a dispatch board system which is relatively inexpensive and practicable to manufacture, which is simple and convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 5 is a transverse vertical section of the control board and a lower portion of the dead panel;

Figure 6 is an enlarged fragmentary detail vertical sectional view showing the arrangement of the lamp mountings which may be substantially duplicated in both the map and the directory;

Figure 7 is a fragmentary front elevational view of these lamp mountings which are numbered to indicate the different taxi stands in the territory concerned;

Figure 8 is a fragmentary rear elevational view of the cabinet housing the control board;

Figure 9 is a fragmentary elevational view of that portion of the multi-pronged disconnector plugs which is secured to a rear panel on a cabinet housing the control board;

Figure 10 is a view indicating how the jacks are arranged at one of the numbered locations corresponding to a single stand, on the control board;

Figure 11 is a fragmentary vertical sectional view of one of these jacks, and contiguous structure including the corresponding plug;

Figure 12 is a vertical sectional view taken substantially on the line 12—12 in Figure 9;

Figure 13 is a three dimensional view of one of the above mentioned plugs, a portion of the head of the plug being broken away and the underlying parts being shown in section and in elevation; and Figure 14 is a diagrammatic view indicating in a general manner the electrical connections in this dispatch board system.

Similar characters of reference indicate similar or identical elements and portions throughout the specification and throughout the several views in the drawings.

Figure 1:
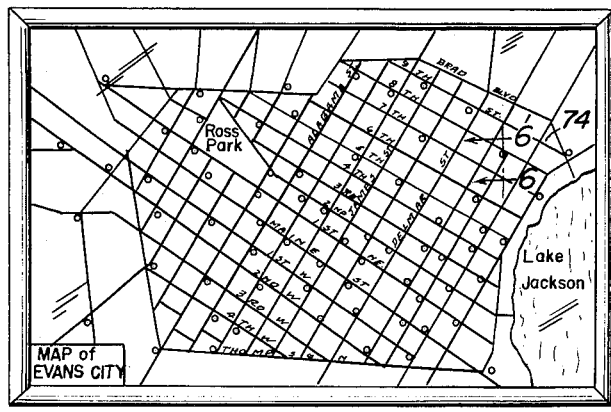
Figure 1 is an elevational view of the illuminated map.
Figure 2:
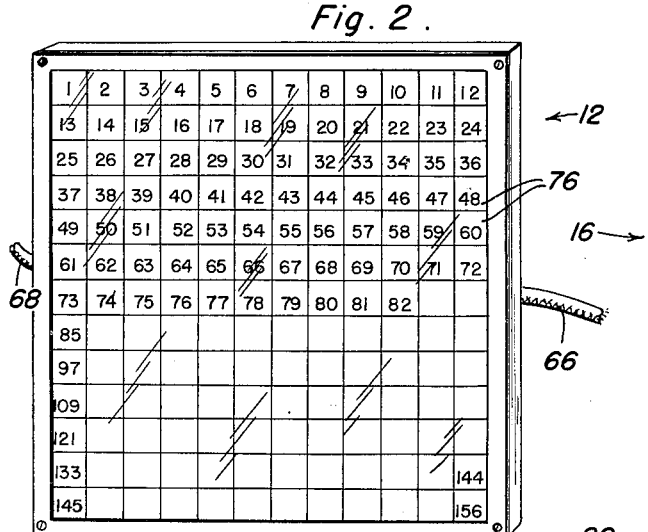
Figure 2 is a three dimensional view of the directory having numerically ordered lamps.

Referring now to the drawings in detail, this dispatch board system includes a unit which will be referred to simply as the map 10, a directory 12, a control board 14 and a dead panel 16. The control board will be mounted as a front panel member in a cabinet 18 which will ordinarily contain a step down transformer 20 powered as indicated at 22 by electricity obtained from regular sources and lead into the cabinet through a plug 24 connected to the primary of the transformer. The secondary of the transformer is connected by a lead 26 to a metal plate 28 on the upper side of the control board 14, while the other side of the secondary of the transformer is connected to a common contact plate 30, indicated in Figure 6, on the rear side of the map 10, by means of a lead 32.

The metal plate 28 is provided with a plurality of apertures 34, each provided with a spring contact collet 36 to receive the metal portion 38 of one of the plugs generally indicated at 40, in Figure 13. It may be here noted that each of the plugs 40 is provided with an insulating head 42 which will be grasped by the hand of the dispatcher. A somewhat similar spring contact collet 44 is mounted on the lower panel portion 46 of the control board and in alignment with each of the apertures 34 in the upper panel of the control board, and if reference be now had to Figure 10, it will be clear how a plurality of these jacks are used, each jack being thought of as comprising a spring contact collet 36 and the spring contact collet structure 44 aligned therewith, it being preferred that three of these jacks 48 are associated with a small plate 50 at each of the locations on the control board 14 numerically corresponding, as indicated by the number plates 52, best indicated in Figure 4, on the control board. Another single jack will be disposed adjacent to the plate 50 and electrically connected therewith through a resistance 54 and a lead 56 will connect the last mentioned single jack 48 with one of the prongs 58 in one of the multi-pronged disconnect plugs 60 mounted on the rear panel of the cabinet 18, thereby electrically connecting all of the jacks 48 disposed at a particular location corresponding to a taxi stand with a particular numbered lamp in the directory 12 and with another lamp in the map 10. These lamps are similar and are illustrated at 62 in Figure 6, a common contact for the lamps in the map 10 being provided as hereinbefore stated by the metal plate 30 and the leads 56 being individually connected through the medium of the prongs 58 with an equal number of conductors in the small cables 64 which may be grouped into a large cable 66 leading to the directory 12, while a similar large cable 68 connects the lamps in the directory 12 with the lamps in the map 10.

Figure 4:
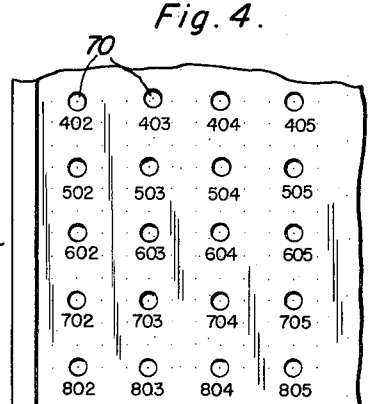
Figure 4 is a fragmentary front elevational view of portions of the control board and dead panel.
Figure 4:
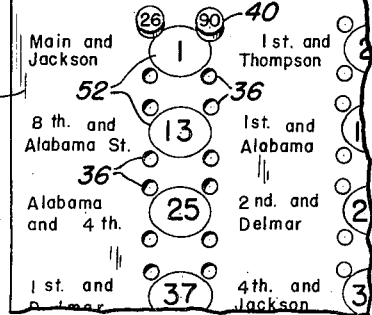
Figure 3:
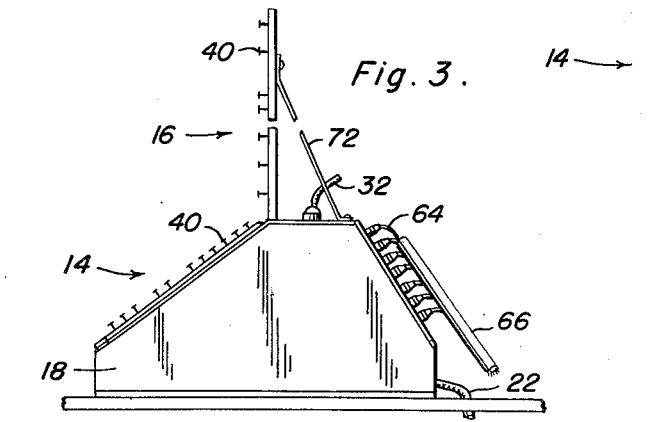
Figure 3 is an end elevational view of the control board with a dead panel mounted on the top thereof.

The dead panel 16 has a plurality of apertures 70 which are numbered as best indicated in Figure 4, these numbers corresponding to individual cabs and/or drivers, and when the corresponding cabs or drivers are idle or inactive for one reason or another the corresponding plugs 40 are inserted into the proper apertures 70 to indicate this fact. It is convenient to mount the dead panel 16 upright above the control board 14 on the top of the cabinet 18, a brace 72 being provided to steady this dead panel, on each side of the cabinet.

The operation of this invention will be clearly understood from the consideration of the foregoing description of the mechanical details thereof, it being understood that map and directory will vary considerably according to the territory to be administered by the dispatcher, it being understood that the different numbered lamps 62 in the map 10 and directory 12 will be disposed behind transparent panels 74 in the case of the map and preferably larger panels 76 in the case of the directory. Obviously suitable means must be provided to prevent the transmission of light from one lamp into the parts of the map and directory which are to be illuminated by the other lamps. A convenient form of transparent panel for an individual lamp is represented in Figure 6, integral flange portions 78 extending into apertures in the panel of the lamp 10. It will be clear how the insertion of a plug 40 into separated jack 48, as indicated in Figure 10, will allow current to flow from the transformer to the directory and map without passing through the resistance 54, and the corresponding lamps will be lighted more brightly than when a plug 40 is inserted into one of the other jacks represented in Figure 10. Accordingly, when the dispatcher wishes to indicate that a cab has arrived at a stand, the proper plug 40, carrying the number assigned to the cab or the driver, is placed in the separate jack so that this fact will be indicated by the bright light at this stand location on both map and directory. When another cab arrives at that stand, or when another cab has been directed to go to that stand, the corresponding plugs will be placed in the jacks 48 which are connected to the plate 50 and the dimmer light will show on both map and directory when the first cab is again dispatched and the corresponding plug removed.

Minor variation from the illustrated forms of the elements in this invention may be resorted to without departing from the spirit of this invention and the scope thereof should be determined only as limited by a proper interpretation of the sub-joined claims.

Having described the invention, what is claimed as new is:

1. A taxi dispatch board system comprising an electric control board having a plurality of switches having individual particularly identified closing means and arranged positionally in relation to each of a number of locations on said control board, one of said switches at each location having less resistance in its circuit than the other switches at the same location, and a map having a lamp connected to each of said switches, whereby the dispatch of a taxi to a particular station and the actual arrival of the taxi can be indicated by lights of different intensity on the map and the particular taxi to arrive first at the station can be indicated by the use of a particular closing means.

2. A system according to claim 1 and wherein said switches and closing means each include a jack and a plug, and a dead panel to receive in ordered arrangement plugs not in use, said plugs being differentiated whereby inactive taxi cabs and drivers are recorded.

HILBERT A. JONES.

REFERENCES CITED

The following references are of record in the file of this patent:

UNITED STATES PATENTS

| Number | Name | Date |
|--------|------|------|
| 998,391 | Powell | July 18, 1911 |
| 1,737,520 | Richardson | Nov. 26, 1929 |
| 2,008,909 | Hershey | July 23, 1935 |
| 2,417,043 | Blewett | Mar. 11, 1947 |

OTHER REFERENCES

Electrical Map Aids Fire Department, page 73 of "The American City," July 1932.